(12) United States Patent
Hutchison

(10) Patent No.: US 7,335,854 B2
(45) Date of Patent: Feb. 26, 2008

(54) METHOD AND SYSTEM OF DETERMINING WIRE FEED SPEED

(75) Inventor: Richard M. Hutchison, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 10/906,906

(22) Filed: Mar. 11, 2005

(65) Prior Publication Data

US 2006/0201923 A1 Sep. 14, 2006

(51) Int. Cl.
*B23K 9/095* (2006.01)

(52) U.S. Cl. ............................................. 219/137.71

(58) Field of Classification Search ........... 219/137.71, 219/137.7, 130.21
See application file for complete search history.

(56) References Cited

U.S. PATENT DOCUMENTS 3,621,185 A * 11/1971 Iceland et al. ........... 219/137.7
3,906,184 A   9/1975 Gibbs et al.
6,963,048 B2 * 11/2005 Huismann et al. ..... 219/137.71
7,015,419 B2 *  3/2006 Hackl et al. ............ 219/137.71
2004/0011775 A1  1/2004 Hackl et al.
2005/0279819 A1* 12/2005 Stava ........................ 235/375

FOREIGN PATENT DOCUMENTS

| EP | 1352698 A | 10/2003 |
|---|---|---|
| JP | 5131271 A | 5/1993 |
| JP | 9295141 A | 11/1997 |
| JP | 2005046881 A | 2/2005 |

* cited by examiner

Primary Examiner—Clifford C. Shaw
(74) *Attorney, Agent, or Firm*—Ziolkowski Patent Solutions Group, SC

(57) ABSTRACT

A system and method for controlling a wire feeder is disclosed. The speed by which a wire feeder delivers consumable weld wire to a weld is dynamically controlled based on feedback from a contact-less sensor. The contact-less sensor provides the feedback directly from the consumable weld wire as it is being delivered to a weld. The present invention is particularly applicable with MIG and CSC welding systems.

17 Claims, 3 Drawing Sheets

METHOD AND SYSTEM OF DETERMINING WIRE FEED SPEED

BACKGROUND OF THE INVENTION

The present invention relates generally to welding and, more particularly, to a method and system of dynamically controlling operation of a wire feeder from feedback regarding actual wire feed speed of the consumable weld wire directly measured from the consumable weld wire as it is being delivered to a weld or welding gun.

MIG welding, also known as Gas Metal Arc Welding (GMAW), combines the techniques and advantages of Tungsten Inert Gas (TIG) welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

MIG systems generally have a wire feeder that is used to deliver consumable filler material to a weld. The wire feeder is typically connected to a power source that powers the driver motor(s) of the wire feeder as well as generate a voltage potential between the consumable filler material and the workpiece. This voltage potential is then exploited to create an arc between the filler material and the workpiece and melt the filler material and workpiece in a weld. The power source and the wire feeder may also be disposed in a common enclosure.

Typical wire feeders have a driven roller assembly for driving the consumable metal wire from a feed spindle through a welding gun for introduction to a weld. The drive mechanism in these driven roller assemblies typically includes a direct current (DC) motor or combination of DC motors to rotatably drive the feed spindle and deliver the consumable metal wire or filler material to the weld. Some wire feeders utilize a multi-motor drive configuration wherein a first motor delivers wire from the feed spindle so as to "push" it toward the gun. This motor is typically referred to as a "push motor." Within this arrangement, the wire feeder also has a second motor to "pull" the wire from the push motor and drive it to the weld. Accordingly, this motor is typically referred to as a "pull motor." Other wire feeders utilize only a single "push" motor to drive the filler material to the weld; however, it is often desirable to have a multiple motor arrangement whereby the motors act in concert to provide a relatively uniform delivery and a taut line of wire from the feed spindle to the welding gun.

For both single and multi-motor wire feeders, fixed control schemes are generally utilized to control operation of the motors. That is, whether through a direct user-input or indirectly set from other user-inputs, the motor(s) are controlled to deliver consumable weld wire at a given wire feed speed (WFS). This is particularly applicable for constant voltage systems where the WFS must be adjusted so as to maintain a constant weld voltage. As one skilled in the art will appreciate, if the voltage setting is fixed, there is an inverse relationship between WFS and weld voltage and, thus, an increase in WFS results in a drop in weld voltage. More generally, however, there is a proportional relationship between WFS and weld voltage. In this regard, increasing WFS requires a higher weld voltage to maintain a stable arc. Conversely, lowering the weld voltage requires a drop in WFS to maintain arc stability. Whether voltage is to remain fixed or vary, it is critical that the speed at which consumable weld wire is delivered to the weld be precisely controlled to avoid blow-through or incomplete welding, and maintain arc stability.

As such, wire feeders typically include an encoder that is designed to provide feedback as to the velocity or rate by which the feed spindle is delivering filler material to the weld or welding gun. That is, a controller or other controlling device causes the motor(s) to deliver wire at a given velocity and the encoder provides feedback to the controller as to whether the motor(s) are causing delivery of the wire at the given velocity. As such, the encoder indirectly monitors the speed by which wire is delivered to the weld or welding gun. That is, WFS is determined from monitoring the motor(s) or the feed spindle, but not from the wire itself. As a result, control of the motor(s) is rigidly based on a presumed WFS.

Other WFS monitoring systems are designed to determine WFS directly from the feed spindle as consumable weld wire is pulled therefrom and delivered to the weld, but such systems also suffer from drawbacks. These systems generally include an idler roller proximate the feed spindle that is turned by direct contact with the feed spindle as it rotates. These contact-based systems, while reasonably accurate, cannot consider changes in WFS once the fee spindle passes the roller. As a result, the WFS determined from feedback from the roller may be inconsistent with the actual speed by which wire is delivered from the welding gun to the weld. This inconsistency can affect welding performance as, for example, the weld voltage may exceed a desired level because the believed WFS is faster than actual WFS. In short, conventional WFS monitoring systems fail to account for effects on WFS that occur at or near the welding gun.

It would therefore be desirable to have a system and method capable of accurately measuring WFS directly from the consumable weld wire as the wire is being delivered to a weld or welding gun, but also take into account effects on WFS that occur at or near the welding gun.

BRIEF DESCRIPTION OF THE INVENTION

The present invention solves the aforementioned drawbacks with a contact-less sensor that is placed in relative proximity to a welding gun so that effects on WFS at or near the welding gun or weld can be considered when measuring WFS.

A contact-less sensor, e.g. an optical sensor, directly measures translational movement of consumable weld wire as the wire is being delivered to a welding gun or weld. The contact-less sensor is designed to provide feedback regarding WFS as well as wire feed direction. The contact-less sensor is preferably placed in relative proximity to the welding gun such that effects on wire speed at or near the welding gun or weld can be included in the feedback provided. The invention is particularly applicable with MIG and Controlled Short Circuit (CSC) welding systems. Exemplary CSC welding systems are described in U.S. Ser. Nos. 10/728,629, 10/435,624, and 10/200,884, the disclosures of which are incorporated herein.

Therefore, in accordance with one aspect of the present invention, a wire feeder includes a source of consumable weld wire to be delivered to a weld during an active weld event. The wire feeder further includes a contact-less sensor configured to provide feedback as to a speed by which consumable weld wire is delivered to the weld directly from the consumable wire as it is delivered from the source to the weld.

In accordance with another aspect, the present invention includes a controller. The controller is configured to receive an indicator of actual WFS directly from consumable weld wire being translated from a wire source to a weld. The controller is further configured to dynamically control operation of a motor delivering the consumable weld wire from the source to the weld from the indicator of actual WFS.

According to another aspect, the present invention includes a welding system having means for delivering consumable wire to a welding gun. The welding system further includes means for determining wire speed feed directly from consumable weld wire as the consumable weld wire is being delivered to the welding gun. The welding system further includes means for regulating the delivery means such that a difference between actual WFS and a desired WFS is reduced.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
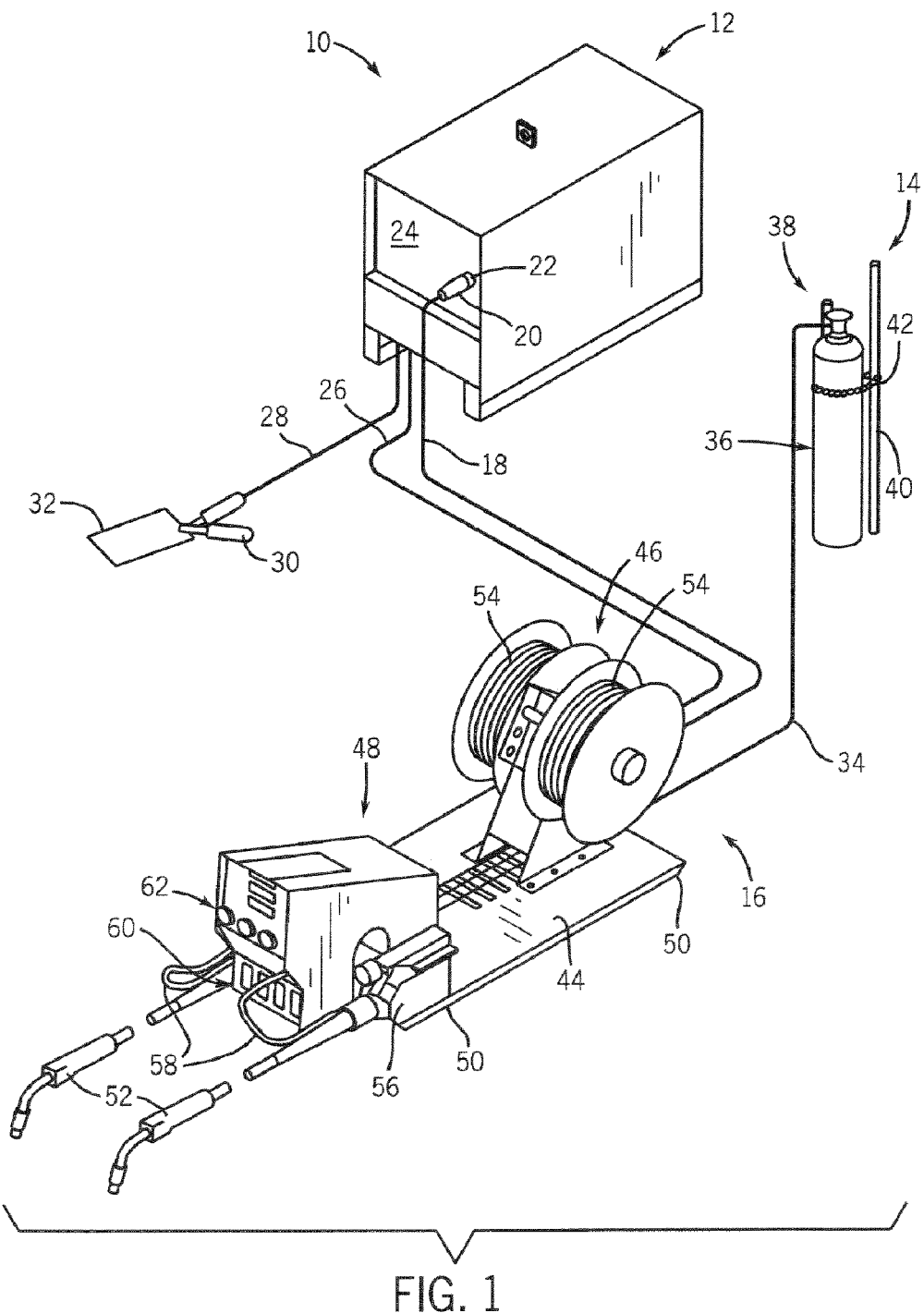
FIG. 1 is a perspective view of an assembled power source and wire feeder combination incorporating the present invention.

Referring now to FIG. 1, an exemplary welding system 10 is shown having a power source 12, a gas cylinder 14, and a wire feeder 16. The wire feeder 16 is electrically connected to the power source 12 via a control cable 18 wherein the cable 18 includes a pin connector 20 that engages a corresponding receptacle 22 on the front panel 24 of the power source 12. Also connected between the power source 12 and the wire feeder 16 is a weld cable 26. The weld cable 26 may be either a positive weld cable or a negative weld cable depending upon the particular welding process. Hereinafter, however, the cable 26 will be described as a positive weld cable. As such, a negative or ground weld cable 28 also extends from the power source 12. The negative weld cable 28 extends from the power source 12 to a clamping member 30, which is configured to hold a workpiece 32. A gas hose 34 is also connected to the wire feeder 16 to supply gas for an arc-welding process from gas cylinder 36. The gas cylinder 36 includes a regulator and flow meter 38 and, in the embodiment illustrated in FIG. 1, is securely positioned against a structure 40 via a chain 42.

The wire feeder 16 includes a base plate 44 which is configured to support wire feed spindles 46 and a control box 48. It should be noted that on the undersurface of the base plate 44 are a number of rubber feet 50 that help to limit sliding of the wire feeder 16. In the illustrated embodiment, the wire feeder 16 includes two welding torches 52 which are supplied with a welding wire 54 stored on the wire feed spindles 46 by a corresponding drive roller assembly 56. Each drive assembly 56 is connected to the control box 48 via leads 58.

As will be described, the control box 48 controls the operation of each drive assembly 56 according to a control technique to avoid kinks or bends in the consumable wire and increased accuracy in delivery of the consumable wire to a weld. While the illustrated embodiment includes multiple torches 52, as will be described with respect to FIG. 3, the present invention is equally applicable with systems utilizing single torch configurations.

Control box 48 includes a number of controls 60 and switches 62 that are used by the welder or technician to conduct the welding process. The switches 60 and switches 62, for example, may include JOG/purge push buttons and an ON/OFF switch, wire speed controls, and a left/right switch selection.

Figure 2:
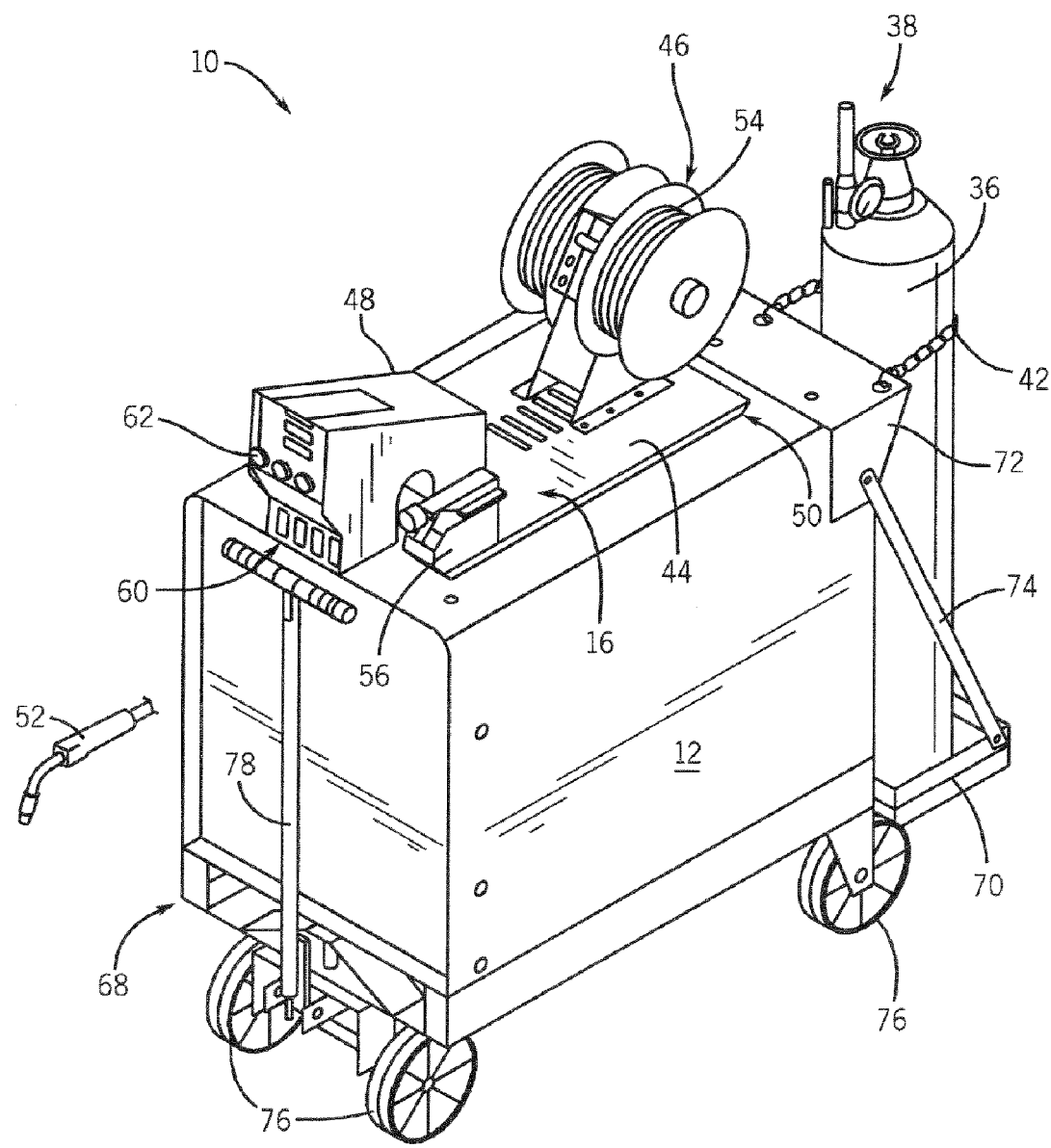
FIG. 2 is a perspective view of an assembled portable embodiment of a power source and a wire feeder.

Referring now to FIG. 2, the aforementioned welding apparatus may also be embodied in a portable system. That is, the wire feeder 16 may be positioned atop the power source 12 and be jointly placed on a pull cart 68. The previously described rubber feet 50 limit sliding movement of the wire feeder 16 when atop the power source 12. The pull cart 68 may also include a cylinder support tray 70 configured to support a gas cylinder 36. In this embodiment, a chain 42 is secured to a plate 72 that is connected to support the tray 70 via a cross-member 74. The plate 72 is designed to be secured to a portion of the power source 12. The pull cart 68 includes wheels 76 and a pulling arm 78 to assist with the transportability of the welding system.

The welding systems shown in FIGS. 1 and 2 illustrate two exemplary systems in which the present invention may be incorporated. However, one skilled in the art will appreciate that the present invention, as will be described herein, is also applicable with other welding systems. For example, the present invention is applicable with integrated welders and wire feeders wherein the power source and the wire feeder components are contained within a common enclosure. The present invention is also applicable with gas-less welding systems wherein a self-shielding flux-cored consumable is delivered to the weld. Furthermore, the present invention is applicable with general MIG welding systems as well as MIG-variant systems such at flux-cored arc welding (FCAW) systems. Moreover, the present invention is applicable with relatively fixed welding systems as well as portable or "suitcase" welding systems and/or components. The invention is also applicable with a number of welding processes, such as CSC welding.

The present invention is directed to a contact-less sensor, such as an optical sensor, that is used to directly measure translational movement of consumable weld wire as the wire is being delivered to a welding gun or torch from a feed supply, such as a spool of welding wire. The invention is applicable with a number of types of wire as well as wire of varying shapes. That is, the present invention is applicable with solid as well as flux-cored wire. The invention is applicable with steel, stainless steel, aluminum, and other weldable metals. Further, the invention is applicable with wire having various cross-sectional shapes, e.g. circular, square, rectangular, triangular, trapezoidal, and the like. Additionally, the invention is applicable with ribbon wire or otherwise generally flat wire. As will be described, the contact-less sensor is designed to provide feedback to a controller regarding WFS as well as wire feed direction. Based on the measured WFS, the controller will dynamically regulate the motor of the wire feeder that drives the spool of welding wire. In this regard, wire delivery can be precisely and accurately controlled such that WFS at or near the welding gun substantially matches the desired WFS of the given welding process.

Figure 3:
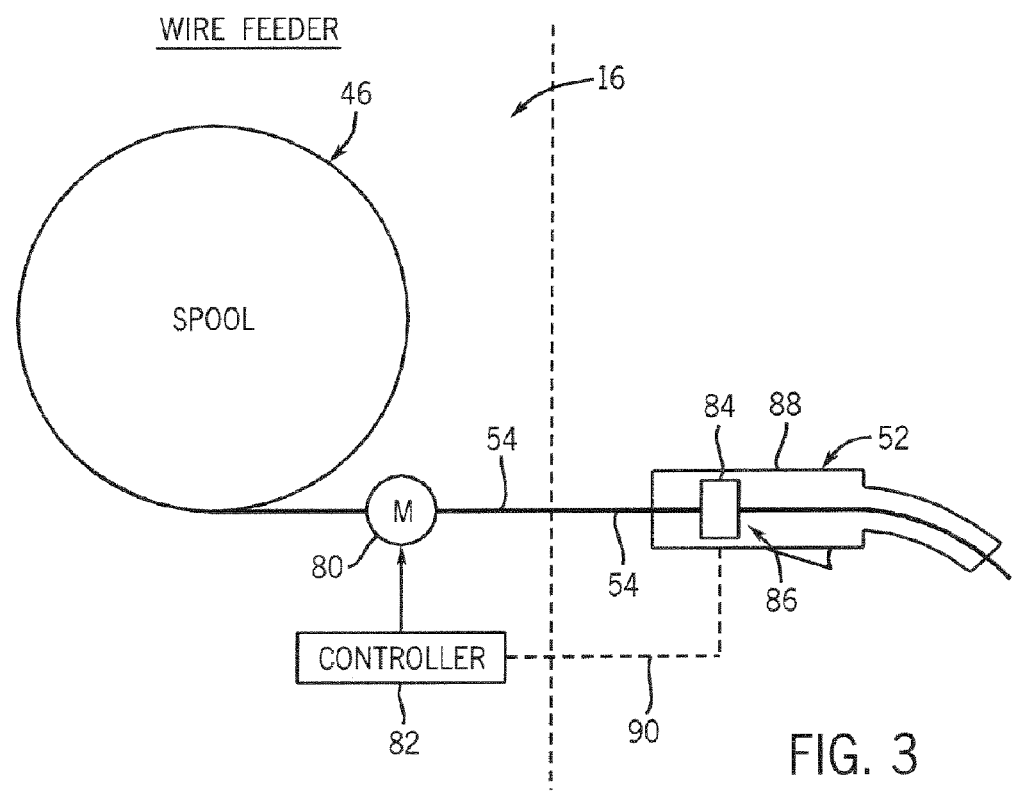
FIG. 3 is a schematic of a wire feeder and welding gun assembly incorporating the present invention.

Referring now to FIG. 3, a schematic illustrates a portion of a wire delivery system incorporating one aspect of the present invention. As shown, wire feeder 16 includes a spool 46 of consumable weld wire 54. A motor and drive module 80 pulls the consumable weld wire from the spool and pushes the pulled weld wire toward the welding gun. The motor and drive module causes the wire to be delivered to the welding gun at a WFS that is commanded by controller 82. In this regard, controller 82 will command motor and drive module 80 such that the desired WFS of the welding process is maintained. As described above, generally, there is a direct relationship between WFS and weld voltage. To maintain arc stability, WFS must respond to changes in weld voltage. Specifically, if the weld voltage increases so must WFS to maintain the stability of the welding arc. As such, to accurately command the motor and module to achieve the desired adjustment in WFS in response to a weld voltage change, the controller receives feedback from a WFS sensor indicative of WFS at or near the weld. Specifically, as will be described with respect to FIG. 3, a contact-less sensor is used to provide WFS feedback to the controller. Moreover, the present invention reduces the error that may be present in the feedback of conventional WFS sensor that typically results in differences in WFS as measured at or near the feed spindle versus the WFS at or near the weld.

As shown in FIG. 3, the present invention includes a sensor 84 that, in illustrated embodiment, is disposed within the welding torch 52. While a number of different types of sensors are contemplated, in one preferred embodiment, sensor 84 is an optical sensor and, as such, optically senses translation of consumable wire 54 without being in contact with the wire as it is being delivered. In this regard, sensor 84 is close in relative proximity to the feed channel 86 in which the consumable wire passes through the torch body 88 as it is being deposited at the weld. Furthermore, while sensor 84 is illustrated as being placed within welding torch 52, it is recognized that sensor 84 may also be placed external to the welding gun. In this regard, it is contemplated that the sensor may be positioned at an inlet end of the torch body. It is also contemplated that the sensor may also be positioned at the outlet from which wire 54 exits the wire feeder 16. However, it is preferred that sensor 84 be positioned as close as possible to the weld such that affects near the weld on WFS are taken into account in determining actual WFS at the weld.

In a preferred embodiment, sensor 84 wirelessly transmits feedback 90 to controller 82. However, it is recognized that a wired connection may also be used to translate the aforementioned feedback. Additionally, in a preferred embodiment, sensor 84 not only provides feedback regarding speed in which wire is passing thereabout but also provides feedback as to the direction of wire travel. More particularly, sensor 84 provides feedback with respect to changes in wire feed direction. In this regard, controller 82 can automatically determine a net WFS as a result of changes in direction of the wire feed at or near the weld. For instance, some welding systems (e.g. CSC) are capable of retracting relatively minute lengths of wire from the weld during the welding process. In this regard, when incorporated into such systems, sensor 84 provides feedback to controller 82 indicating the change in wire feed direction. Since this change in wire feed direction has an impact on the actual delivery rate of wire to the weld, controller 82 may incorporate this change-in-direction feedback in determining a net actual WFS. Moreover, this direction feedback may be used by other control loops of the wire feeder and/or power source (welder).

Figure 4:
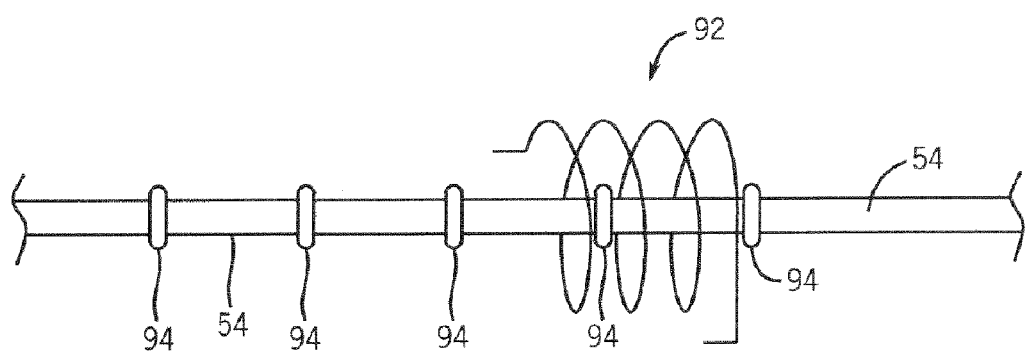
FIG. 4 is a schematic of a WFS monitoring system in accordance with an alternate embodiment of the present invention.

As referenced above, in one preferred embodiment, sensor 84 is an optical sensor and, thus, optically senses WFS. It is contemplated, however, that a number of other sensory devices in addition to optical sensors need be used. For example, as shown in FIG. 4, an electromagnetic coil 92 may also be used to inductively measure changes in current as being indicative of changes in WFS. The coil 92 may be disposed within the welding gun or extend to the gun along the path in which the wire is translated to the gun or weld. As the consumable wire 54 passes through the electromagnetic coil 92, a current is induced. At defined intervals of wire feed length, an indicia or other indicator 94 may be incorporated such that a rise or drop in current is induced in the coil when that indicia passes through the coil. As such, the controller can measure, using the electromagnetic coil, the temporal difference between changes in current and the wire and, more particularly, the intervally disposed indicators 94 pass through the coil. In this regard, a change in the measured interval would be indicative of a change in WFS and controller 82 may then determine actual WFS more accurately directly from the consumable wire at or near the weld. In one embodiment, the indicators 94 are arranged as annular rings of consumable material that are integrated with the main body of the consumable wire. Furthermore, in one embodiment, the indicators are spaced apart by one inch.

While FIGS. 3 and 4 have been described with respect to a single contact-less WFS sensor, it is recognized that multiple sensors may be used to directly measure the speed at which consumable wire is delivered without contacting the wire itself. In this regard, the controller may consider the feedback from multiple sensors to more precisely determine WFS. Additionally, while the present invention has been described with respect to a contact-less sensor for providing feedback regarding consumable wire being fed to a welding gun, it is contemplated that the invention is also applicable for those applications where it is desirable to measure the speed at which an object is delivered without contacting the object itself.

Therefore, the present invention includes a wire feeder causing a source of consumable weld wire to be delivered to a weld during an active weld event. The wire feeder further includes a contact-less sensor configured to provide feedback as to a speed by which consumable weld wire is delivered to the weld directly from the consumable wire as it is delivered from the source to the weld.

The present invention also includes a controller configured to receive an indicator of actual WFS directly from consumable weld wire being translated from a wire source to a weld. The controller is further configured to dynamically control operation of a motor delivering the consumable weld wire from the source to the weld from the indicator of actual WFS.

The present invention further includes a welding system having means for delivering consumable wire to a welding gun. The welding system further includes means for determining wire speed feed directly from consumable weld wire as the consumable weld wire is being delivered to the welding gun. The welding system further includes means for regulating the delivery means such that a difference between actual WFS and a desired WFS is reduced.

The present invention has been described in terms of the preferred embodiment, and it is recognized that equivalents, alternatives, and modifications, aside from those expressly stated, are possible and within the scope of the appending claims.

What is claimed is:

1. A wire feeder comprising:
   a source of consumable weld wire to be delivered to a weld during an active weld event;
   a contact-less sensor configured to provide feedback as to a net speed by which consumable weld wire is delivered to the weld from the consumable wire as it is delivered from the source to the weld; and
   wherein the contact-less sensor includes an optical sensor configured to provide feedback as to a direction by which consumable weld wire is delivered to the weld.

2. The wire feeder of claim 1 further comprising a feed channel configured to receive consumable weld wire from the source and output the received consumable wire to a welding gun.

3. The wire feeder of claim 2 wherein the contact-less sensor is positioned in relative proximity to the feed channel and further configured to provide the feedback from the consumable weld wire as the consumable weld wire passes through the feed channel.

4. The wire feeder of claim 1 further comprising a controller configured to receive the feedback and, from the feedback, regulate delivery of consumable weld wire from the source to the weld.

5. The wire feeder of claim 4 further comprising at least one motor designed to deliver the consumable weld wire from the source and wherein the controller is further configured to regulate the motor such that a desired wire feed speed is substantially maintained.

6. The wire feeder of claim 5 wherein the at least one motor includes a single motor designed to deliver consumable weld wire to the weld and retract delivered consumable weld wire during a CSC transfer mode of welding.

7. The wire feeder of claim 1 configured to deliver consumable weld wire for at least one of a CSC welding process and an MIG welding process.

8. The wire feeder of claim 1 wherein the contact-less sensor includes an electromagnetic sensor designed to sense changes in linear position of a marker of a length of consumable weld wire.

9. A controller configured to:
   receive an indicator of actual wire feed speed from consumable weld wire being translated from a wire source to a weld; from the indicator of actual wire feed speed, dynamically control operation of a motor delivering and retracting the consumable weld wire between the source and the weld; and
   receive feedback as to speed by which consumable wire is being delivered to the weld and as to changes in direction in consumable wire translation.

10. The controller of claim 9 further configured to receive the indicator of actual wire feed speed from a contact-less sensor designed to provide feedback as to actual wire feed speed from consumable wire being translated past the contact-less sensor.

11. The controller of claim 10 wherein the contact-less sensor includes an optical sensor.

12. The controller of claim 11 further configured to determine a net wire feed speed from the feedback.

13. The controller of claim 9 disposed in a wire feeder of one of a CSC and a MIG welding system.

14. A welding system comprising:
   means for delivering consumable wire to a welding gun;
   means for determining wire feed speed and wire feed direction from consumable weld wire as the consumable weld wire is being delivered to the welding gun; and
   means for regulating the delivering means such that a difference between actual wire feed speed and a desired wire feed speed is reduced.

15. The welding system of claim 14 wherein the determining means includes an optical sensor designed to provide feedback regarding wire feed speed and wire feed direction.

16. The welding system of claim 14 wherein the delivering means includes a single drive motor configured to pull consumable wire from a spool and push the pulled consumable wire to the welding gun.

17. The welding system of claim 14 configured for at least one of CSC welding and MIG welding.

* * * * *